Sept. 8, 1942. W. J. EDWARDS 2,295,458
TREE UPROOTING DEVICE
Filed March 22, 1940 3 Sheets-Sheet 1

INVENTOR.
William J. Edwards
BY
ATTORNEY.

Sept. 8, 1942.　　　W. J. EDWARDS　　　2,295,458
TREE UPROOTING DEVICE
Filed March 22, 1940　　　3 Sheets-Sheet 2
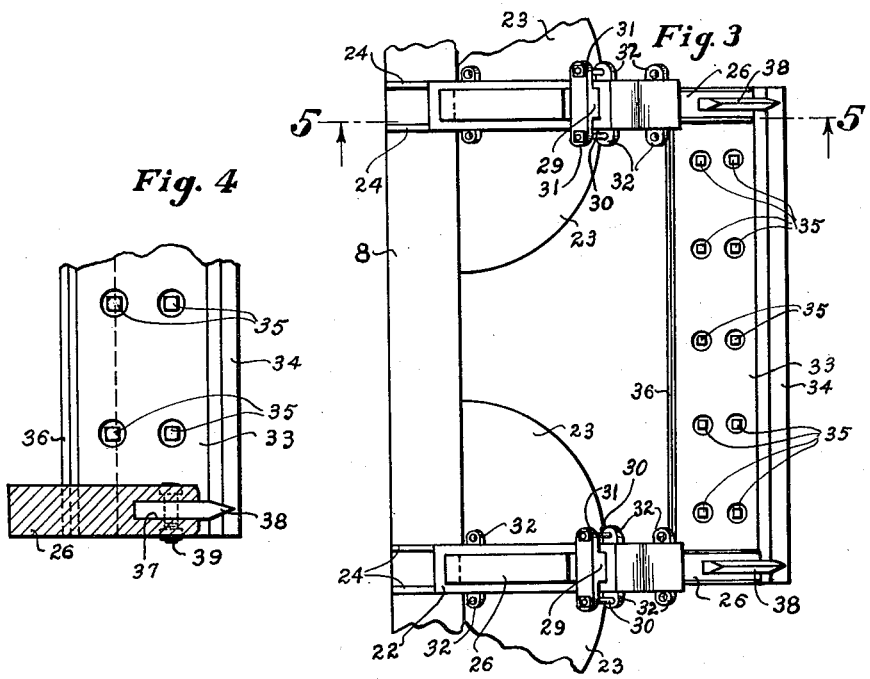
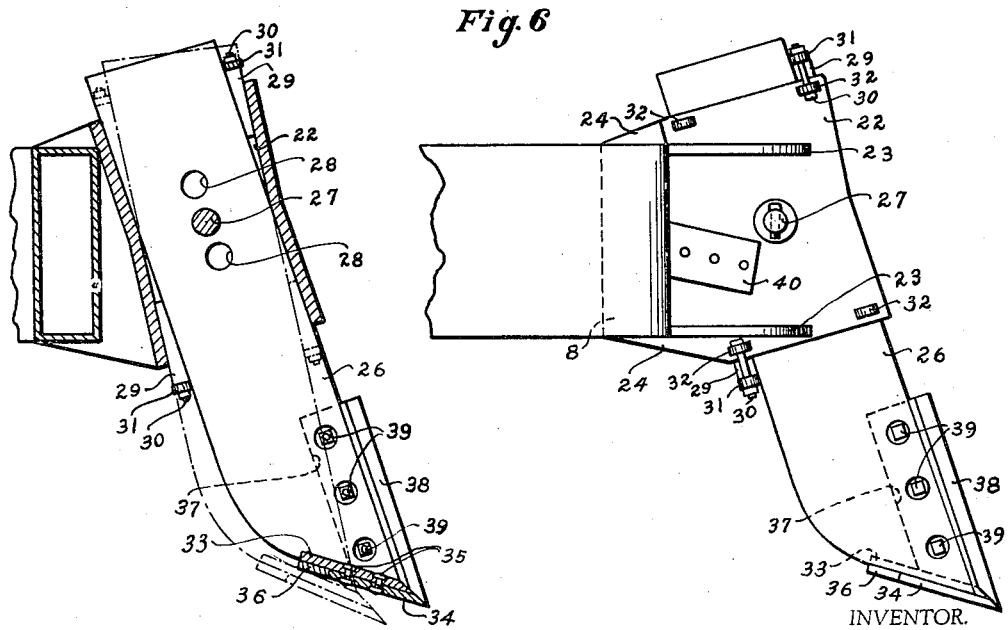
INVENTOR.
William J. Edwards
BY
ATTORNEY.

Sept. 8, 1942.   W. J. EDWARDS   2,295,458
TREE UPROOTING DEVICE
Filed March 22, 1940   3 Sheets-Sheet 3

INVENTOR.
William J. Edwards
BY
his ATTORNEY.

Patented Sept. 8, 1942

2,295,458

UNITED STATES PATENT OFFICE 2,295,458

TREE UPROOTING DEVICE

William J. Edwards, Wichita Falls, Tex.

Application March 22, 1940, Serial No. 325,431

6 Claims. (Cl. 37—2)

This invention relates to an improvement in devices for uprooting trees, shrubs, and the like for ready removal thereof from the soil.

Heretofore, machines for removing or uprooting trees or shrubs have been cumbersome and expensive, and power driven machines have usually utilized an arrangement attached to the rear of a tractor in the nature of a plow, making it necessary for the operator to drive the tractor over the trees and shrubs before they are loosened from the soil.

The object of this invention is to simplify and improve machines of this character to provide for effectively loosening and uprooting trees and bushes, and yet provide sturdiness of construction and ready attachment to or detachment from a conventional tractor, so as to utilize the tractor for other purposes.

A further object of the invention is to provide for the location of the root loosening plow or device at the front end of the tractor, where it may be lowered into the soil for uprooting trees and bushes in advance of the tractor and yet without disturbing the surrounding vegetation or grass growing on the surface of the soil, which is left substantially undisturbed, provision being made for applying a cutting or loosening action at the desired depth beneath the surface of the soil just sufficient to loosen the roots of trees and bushes, and then directing the sod back into level position so as not to disturb the growth of grass.

This is especially beneficial for use in removing small bushes, trees, and the like from arid land, while conserving the growth of grass thereon after removal of the shrubs. In the western sections of the United States, small mesquite bushes or trees grow rampant in uncultivated soil, especially grass lands, which have a tendency to consume the moisture and shade the grass to such an extent that it becomes unfit for pasture land or grazing. These bushes may be readily loosened without disturbing the grass sod, by applying a plowing action spaced beneath the surface of the ground sufficient to loosen the roots of the bushes but without disturbing the growth of the grass since the soil is directed back over the plow into flat relation substantially undisturbed by the plowing or uprooting action.

The invention preferably utilizes what may be termed a sub-soil blade suspended from arms carried on the sides of a tractor and extending forwardly therefrom in position to lower said blade to the desired depth beneath the surface of the soil according to the root growth of the bushes or plants to be removed. Then by forward operation of the tractor, the blade is moved through the soil beneath the surface thereof to accomplish a loosening action of the roots of the bushes for ready removal thereof, while the sod passes over the blade and settles back into the same position previously occupied, substantially undisturbed by the uprooting action. Provision is made for proper adjustments, as may be desired, both as to angle and depth of the blade, and it is braced for secure and positive operation.

A preferred embodiment of the invention is illustrated in the accompanying drawings, in which:

Fig. 3 is an enlarged top plan view of the front end portion of the device;

Fig. 4 is a horizontal sectional view through an upright support for the blade and showing a portion of the blade in plan;

Fig. 5 is a vertical sectional view through the blade and guide, substantially on the line 5—5 of Fig. 3, parts being in elevation;

Fig. 6 is a side elevation of said front end portion of the device;

I have shown the invention applied to a power vehicle of the tractor type designated generally by the numeral 1, and having a power plant 2, such as an internal combustion engine constructed to be self-propelled on running gear shown as of the crawler or endless track type, as designated by the numeral 3 and extending about guideways 4, suitably formed in the frame of the running gear.

Figure 2:
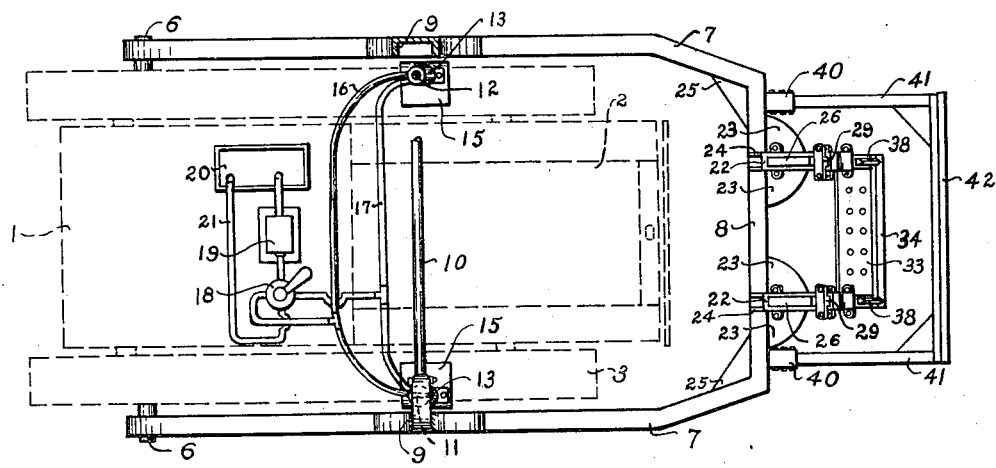
Fig. 2 is a top plan view thereof, partly in section, and showing the tractor in dotted lines.
Figure 7:
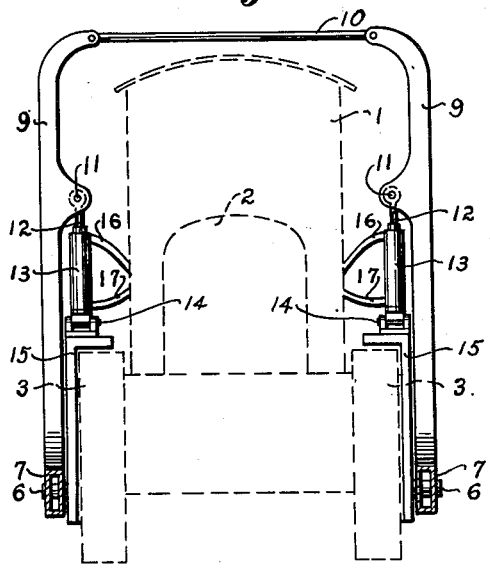
Fig. 7 is a vertical sectional view through the supporting arms and super-structure, substantially on the line 7—7 of Fig. 1, parts being in elevation.
Figure 8:
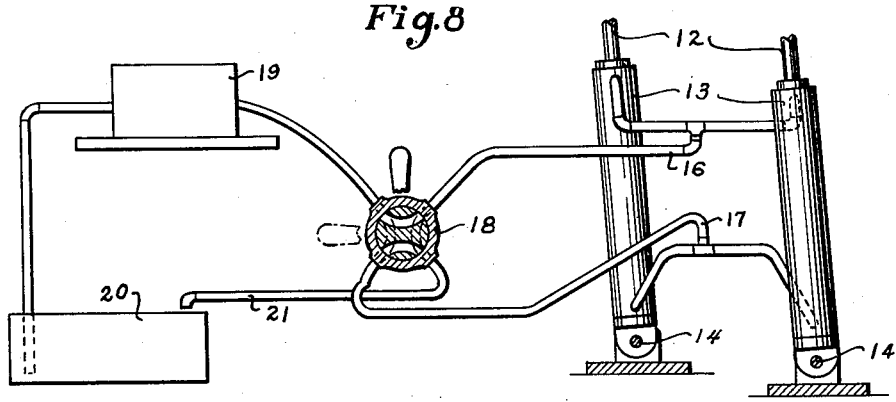
Fig. 8 is a diagrammatic view showing the control valve for the hydraulic system.

The running gear frames are also provided with pivotal supports or trunnions 6, upon which are pivotally supported the back ends of side arms 7, which extend forwardly on opposite sides of the tractor generally in parallel relation, as shown in Fig. 2, and have their forward ends connected together by a connecting bar 8.

Mounted upon each of the side arms 7, intermediate the length thereof, is an upstanding post 9 which extends upwardly on the outer side of the tractor, and the upper ends of these posts 9 are connected together by a cross bar 10 (see Fig.

7) for securely bracing the super-structure of the device.

Pivotally connected at 11 with each of the posts 9 is one end of a connecting rod 12, the opposite end of which extends into a cylinder 13, where it is provided with a piston operatively mounted in said cylinder and adapted to be actuated by liquid forced into the cylinder to act on the piston for moving the same and the connecting rod thereof in one direction or another. The cylinder 13 is pivotally connected at 14 with an upstanding frame 15, secured to the running gear frame and extending upwardly beside and over the endless track 3 for supporting the hydraulic power device 12—13 thereon. The frames 15 also act as guides for the arms 7 during the raising and lowering operation thereof, keeping these arms properly spaced from the endless track of the tractor.

For supplying liquid under pressure to the cylinders 13 at the respective upper and lower ends thereof, flexible pipes or hose 16 and 17, extend respectively to said upper and lower ends acting alternately for supplying liquid under pressure to one end of each cylinder, while discharging the liquid from the opposite end thereof to accomplish movement of the piston in the cylinder in the desired direction. The pipes or hose 16 and 17 for the pair of cylinders are connected together and to a four-way valve 18 for controlling the supply and discharge of the liquid. A pump 19 connected with a reservoir 20 is used for supplying liquid under pressure through the four-way valve 18 to the cylinders, the discharge being directed from the four-way valve through a pipe 21 back into the reservoir 20. Thus upon turning the four-way valve 18 to the desired position, liquid is forced under pressure by the pump 19 through one of the hose or pipes 16—17 into corresponding ends of the cylinders 13, while liquid from the opposite ends thereof is discharged through the other hose or pipes and the four-way valve back into the reservoir 20.

As shown more clearly in Figs. 3 to 6, the connecting bar 8 extending between the forward ends of the side arms 7, has mounted thereon in laterally spaced relation a pair of sockets 22, which may be welded or otherwise rigidly fastened to the connecting bar 8, and preferably braced by gusset plates 23, welded between the sides of the sockets 22, and the connecting bar 8 to prevent lateral displacement of these sockets. Similar gussets 24 are interposed between the upper and lower ends of the sockets 22 and the adjacent portions of the connecting bar 8, as further aid in strengthening these sockets and securely holding them in proper positions relative to the connecting bar. Gussets may be used also between the connecting bar 8 and the side arms 7, as indicated at 25 in Fig. 2.

Slidably received in the sockets 22 are upright supports 26 connected therewith by pins 27, one for each upright support and extending through the socket 22 and through a selected one of a series of holes 28 in the shank of the upright support 26, whereby the latter may be adjusted vertically relative to the socket 22, as may be desired. The upper and lower portions of each socket 22 are flared forwardly and backwardly to provide for pivotal movement of the support 26 therein on the pin 27, and wedges 29 are adapted to be inserted on opposite sides of the support 26 at the respective opposite ends of each socket 22 for securing said support in the proper and desired angular position relative thereto. The wedges 29 are secured firmly in place by bolts 30 which extend between lugs 31 on the adjacent end of the wedge 29 and lugs 32 on the adjacent end of the socket 22. By shifting these wedges and rocking the upright supports 26 on the pivot pins 27, said supports may be tilted to either of the positions shown in full lines and dotted lines, respectively, in Fig. 5, and will be held firmly in the adjusted postions.

The lower ends of the upright supports 26 have suspended therebetween and rigidly secured thereto in bridging relation, a transverse support 33, to the underside of which is secured in abutting relation a sub-soil blade 34 by bolts 35, which rigidly hold said blade to the transverse support 33 and yet permit ready removal of the blade when desired for replacement or sharpening thereof. The back edge portion of the blade 34 abuts against a stationary bar 36 rigidly secured to or formed integrally with the transverse support 33, as an additional bracing support for the blade.

The lower edge portions of the upright supports 26 have slots 37 in the forward faces thereof, in which are received upright cutting blades 38, secured in place by bolts 39.

Figure 1:
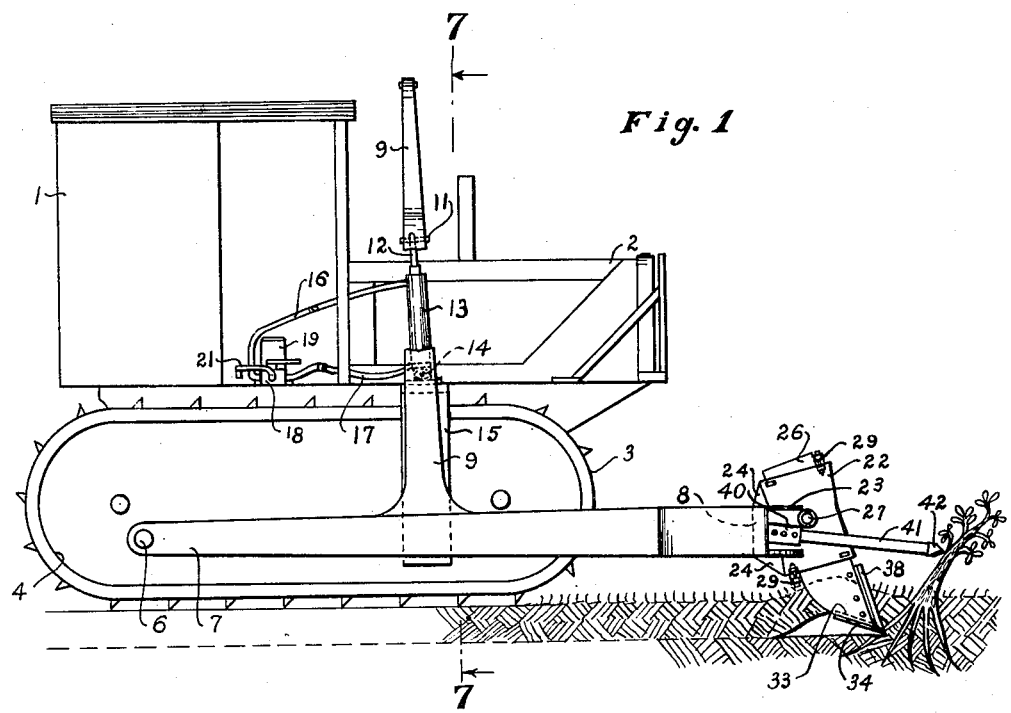
Fig. 1 is a side elevation showing the invention applied to a tractor.

Rigidly secured to the opposite ends of the connecting bar 8 are sockets 40 adapted to receive the side arms 41 attached to a connected bumper bar 42, as shown in Figs. 1 and 2, which bumper bar is spaced forwardly of the sub-soil blade 34 and thereabove for engaging the bush or tree to apply a pushing strain thereto when the roots are loosened by the sub-soil blade, to facilitate ready removal of the bush or tree by the bumper or otherwise.

In the use of the device, the depth of cut of the blade may be adjusted relative to the side arms 7 by the selected holes 28 through which the pins 27 pass for connecting the upright supports 26 with the sockets 22, while the angle of the blade 34 may be adjusted according to the tilting of the upright supports relative to the sockets according to the placement of the wedges 29 therein, as indicated respectively in full lines and in dotted lines in Fig. 5.

When the tractor is operated, the valve 18 is manipulated by the operator to direct fluid under pressure into the upper ends of the power devices 12—13 during the forward movement of the tractor, thereby applying downward pulling action to the side posts 9 for swinging the arms 7 downwardly, and thus forcing the sub-soil blade 34 into the soil to the desired depth of cut according to the size and character of the bushes or trees to be loosened or removed. When this depth is reached, the operator stops the pump 19 to hold the pressure on the power devices, and the blade 34 will remain at the set position during the continued forward motion of the tractor.

The operation of the tractor with the blade spaced downwardly in the soil below the upper surface thereof, causes a shearing action under the turf or sod sufficient to loosen this and allow the sod to pass over the blade and settle back into the trench thus formed without substantial disturbance. However, the blade 34 will act to cut or loosen the roots of bushes and trees, during which time the bumper bar 42 presses forwardly thereagainst tending to loosen the bushes or trees and pushing them over, substantially removing them or injuring their growth to such an extent as to cause them to become defoliated and eventually to die or to be readily removed from the soil where they no longer exercise a deleterious effect on the growth of the grass and other desirable vegetation at the surface of the soil.

The amount of soil acted on by the device is that engaged by the blade 34 between the supports 26, which blade is preferably of only such length as to be readily operated by the power of the tractor without substantial loss of traction. The blade is preferably of less width than the traction elements of the tractor to provide firm soil for engagement by the latter without danger of disturbance of the soil by the traction thereof.

Where the soil is light and porous, the bumper 42 is not required and may be readily removed from the sockets 40, the loosening of the roots by the sub-soil blade being sufficient for ready removal of the bushes and trees.

When it is desired to lift the blade from the soil, the four-way valve 18 is turned to a position, so as to direct fluid under pressure through the pipes 17 into the lower ends of the cylinders 13 for acting upwardly on the pistons, swinging the arms 7 in an upward direction to lift the blade 34 from the soil. This lifting action is accomplished during the forward motion of the tractor, resulting in very little damage to the grass and surface of the soil, and leaving no hole therein as would result from a bodily lifting of the blade when the tractor is stationary.

While the invention is primarily designed for the uprooting of trees, bushes and the like, it is obvious that it may be used for loosening the subsoil, or for removing sod therefrom which will be cut loose by the device and may be readily rolled up for removal.

I claim:

1. In a tree uprooting device, the combination of a tractor, a frame mounted on the tractor and extending forwardly thereof, said frame having forwardly opening sockets at the front end portion thereof, means detachably mounted in said sockets and carried by the frame in position to engage trees and the like to apply a bending action thereto upon forward motion of the tractor, and a blade carried by the frame and disposed rearwardly of the forward end portion of said tree engaging means and in position to pass through the soil beneath the surface thereof for loosening the roots of the tree bearing against said engaging means.

2. In a tree uprooting device, the combination of a tractor, a frame carried by the tractor and extending forwardly therefrom, said frame having forwardly opening sockets at the front end portion thereof, a blade suspended from the frame and carried thereby in position to enter the surface of the soil to loosen tree roots and the like, and bumper means detachably mounted in said sockets and carried by the frame with the forward portion thereof spaced forwardly of said blade and in position to be disposed above the surface of the ground to engage the tree substantially upon loosening of the roots thereof by the blade.

3. In a tree uprooting device, the combination of a tractor, a frame carried by the tractor and extending forwardly therefrom, said frame having forwardly opening sockets at the front end portion thereof, a blade extending transversely of said frame forwardly of the tractor, means for supporting said blade on the frame spaced appreciably therebelow in position to enter beneath the surface of the soil for loosening tree roots and the like during forward motion of the tractor, a bumper bar extending transversely of the frame forwardly of the blade and spaced thereabove in position to bear against a side of the tree when the roots thereof are loosened by the blade, and side arms carrying said bumper bar and detachably engaged in the sockets for mounting said bumper bar on the frame.

4. In a device of the character described, the combination of a supporting frame, sockets carried by said frame and having enclosed sides, supports pivotally mounted in the respective sockets and extending downwardly therefrom for swinging movement relative thereto, wedging means inserted between the edges of the supports and sockets holding the supports rigidly in adjusted positions relative thereto, and a blade extending transversely between said supports and carried thereby.

5. In a device of the character described, the combination of a supporting frame, sockets mounted on said frame, supports extending in said sockets, means pivotally connecting said supports with the sockets, said sockets having laterally flared upper and lower portions, wedging means engaging between the flared portions of the sockets and said supports for holding said supports in set positions relative to the sockets, and a blade extending between the supports and carried thereby.

6. In a device of the character described, the combination of a supporting frame, upright sockets mounted on the forward end of the frame and having enclosed sides, upwardly extending supports received in the sockets and pivotally connected therewith for swinging movement relative thereto, a blade carried in bridging relation between the supports, and means interposed between one or more of the supports and the adjacent edge of the socket or sockets for holding the same in adjusted position relative thereto.

WILLIAM J. EDWARDS.